US010043239B2

(12) United States Patent
Johannesson

(10) Patent No.: US 10,043,239 B2
(45) Date of Patent: Aug. 7, 2018

(54) USING DIGITAL IMAGES OF A FIRST TYPE AND A FEATURE SET DICTIONARY TO GENERATE DIGITAL IMAGES OF A SECOND TYPE

(71) Applicant: The Climate Corporation, San Francisco, CA (US)

(72) Inventor: Gardar Johannesson, San Francisco, CA (US)

(73) Assignee: The Climate Corporation, San Francisco, CA (US)

(*) Notice: Subject to any disclaimer, the term of this patent is extended or adjusted under 35 U.S.C. 154(b) by 0 days.

(21) Appl. No.: 15/357,961

(22) Filed: Nov. 21, 2016

(65) Prior Publication Data

US 2017/0323426 A1    Nov. 9, 2017

Related U.S. Application Data

(60) Provisional application No. 62/332,410, filed on May 5, 2016.

(51) Int. Cl.
*G06K 9/32* (2006.01)
*G06T 3/40* (2006.01)
(Continued)

(52) U.S. Cl.
CPC .............. *G06T 3/4007* (2013.01); *A01G 1/00* (2013.01); *A01G 2/00* (2018.02); *G06T 5/001* (2013.01);
(Continued)

(58) Field of Classification Search
CPC ..... G06T 3/4053; G06T 3/4007; G06T 5/001; G06T 5/50; G06T 11/60;
(Continued)

(56) References Cited

U.S. PATENT DOCUMENTS 7,733,409 B2    6/2010    Fleury
8,675,999 B1*   3/2014    Liang ................. G06T 3/4053
                                                    382/299

(Continued)

OTHER PUBLICATIONS

International Searching Authority, International Search Report in application No. PCT/US2017/030362, dated Sep. 5, 2017, 19 pages.
Current Claims in application No. PCT/US2017/030362, dated Sep. 2017, 10 pages.

*Primary Examiner* — Ali Bayat
(74) *Attorney, Agent, or Firm* — Elliot H. Karlin; Hickman Palermo Becker Bingham LLP

(57) ABSTRACT

Systems and methods for generation of images of a particular type from images of a different type are disclosed. In an embodiment, an agricultural intelligence computer system receives a first plurality of images of a first type and a second plurality of images of a second type. The first and second types may refer to variances in resolution, frequency ranges of frequency bands, and/or types of frequency bands used to generate the images. Based on the first plurality of images and the second plurality of images, the agricultural intelligence computer system generates a feature set dictionary comprising mappings from features of the first plurality of images to features of the second plurality of images. When the agricultural intelligence computer system receives a particular image of the first type, the agricultural intelligence computer system uses the received image and the feature set dictionary to generate an image of the second type.

16 Claims, 12 Drawing Sheets

(51) Int. Cl.
*A01G 2/00* (2018.01)
*A01G 1/00* (2006.01)
*G06T 5/00* (2006.01)
*G06T 5/50* (2006.01)
*G06T 11/60* (2006.01)

(52) U.S. Cl.
CPC .............. *G06T 5/50* (2013.01); *G06T 11/60* (2013.01); *G06T 2207/10032* (2013.01); *G06T 2207/20221* (2013.01); *G06T 2207/30188* (2013.01)

(58) Field of Classification Search
CPC . G06T 2207/10032; G06T 2207/20221; G06T 2207/30188
See application file for complete search history.

(56) References Cited

U.S. PATENT DOCUMENTS

| | | |
|---|---|---|
| 9,007,490 B1 | 4/2015 | Yuan et al. |
| 2001/0026592 A1 | 10/2001 | Moutin |
| 2007/0222782 A1 | 9/2007 | Solecki |
| 2009/0087016 A1 | 4/2009 | Berestov et al. |
| 2010/0002130 A1 | 1/2010 | Kamio |
| 2010/0066854 A1 | 3/2010 | Mather et al. |
| 2010/0220906 A1 | 9/2010 | Abramoff et al. |
| 2014/0212013 A1* | 7/2014 | Han ............... G06T 11/003 382/131 |
| 2014/0270452 A1* | 9/2014 | Goshen ............ G06T 3/4053 382/131 |
| 2016/0012567 A1* | 1/2016 | Siddiqui .......... G06T 3/4007 382/154 |

\* cited by examiner

Fig. 2
(a)
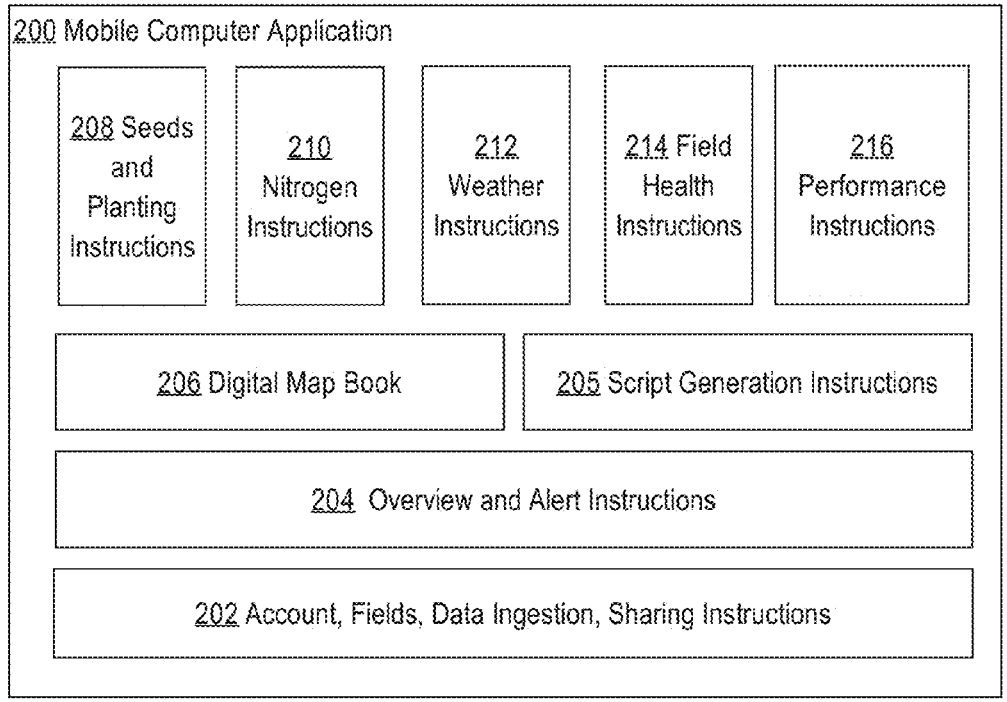
(b)
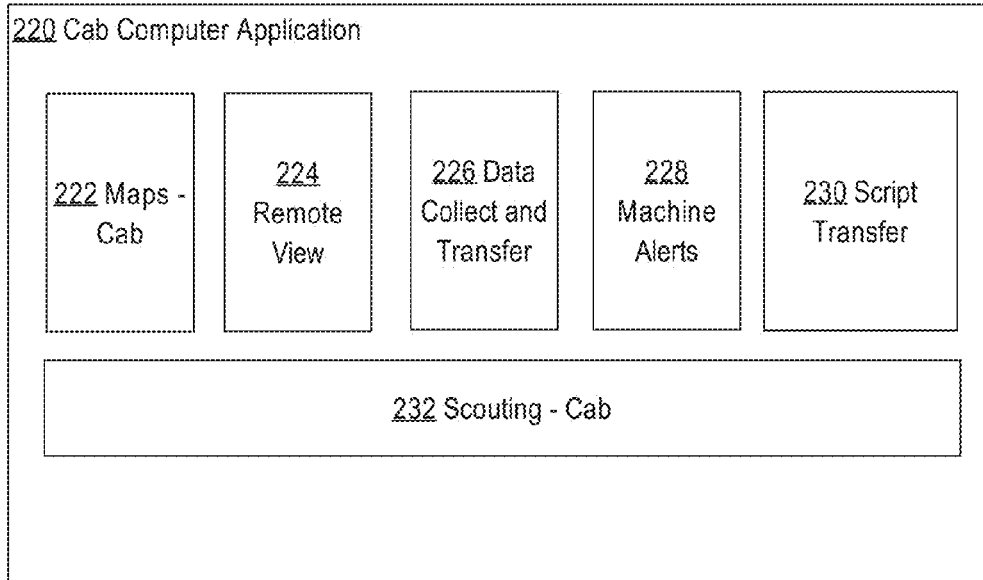

USING DIGITAL IMAGES OF A FIRST TYPE AND A FEATURE SET DICTIONARY TO GENERATE DIGITAL IMAGES OF A SECOND TYPE

CROSS-REFERENCE TO RELATED APPLICATIONS; BENEFIT CLAIM

This application claims the benefit under 35 U.S.C. § 119(e) of provisional application 62/332,410, filed May 5, 2016, the entire contents of which is hereby incorporated by reference as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure is in the technical field of computer systems useful in digital image processing. The disclosure also is in the technical field of computer systems that are programmed or configured to generate an image feature set dictionary from pixel sets of a digital image and use the image feature set dictionary to generate new digital images.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Satellite-based digital imaging can be extremely useful in agricultural. Satellite images of particular fields can be used to provide farmers with vegetation maps as well as assess problems within a field, such as nitrogen stress. Often, it is useful to provide a farmer with frequent satellite images of a field managed by the farmer. Unfortunately, some sources of satellite images may not provide images frequently enough to be useful to a farmer in identifying problems during the growing season. Thus, satellite images from a first source may be supplemented with satellite images from one or more other sources.

Using satellite images from different sources presents problems, however. A first problem is with image resolution. A first source may be able to provide images at a five meter resolution while a second source may only be able to provide images at 20 meter (m) resolution. While the 20 m resolution images may be interpolated onto a five meter resolution image grid, the resulting image would still miss a large amount of detail that was shown in the five meter resolution images. The differences in the two images may create the illusion of changes in the field that are not there.

A second problem in using satellite images from different sources is that various satellites use different ranges of frequencies for a particular frequency band. The frequency bands refer to a range of frequencies of light used by a satellite to produce an image. Satellites may include frequency bands for blue, green, red, near infrared, and infrared frequencies of light. As there is no uniformity in the definitions of each frequency band, various satellites may use different ranges of frequencies in their frequency bands. For example, a green frequency band for a first satellite may include frequencies of 520-590 nm while the green frequency band for a second satellite may include frequencies of 525-600 nm. These differences can cause a shift in the produced images, thereby creating the illusion of changes in the field that are not there.

A third problem in using satellite images from different sources is the availability of certain types of information from each source. For example, a first source of satellite images may be generated without a particular frequency band, such as a blue frequency band. When comparing multiple images, images produced with the blue frequency band would look very different from images produced without the blue frequency band.

Thus, there is a need for generating uniform images of a single type from images of different types. Additionally, there is a need for a method of generating high resolution images from low resolution images that contain the same levels of detail and patterns as received high resolution images of the same location.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

DETAILED DESCRIPTION

Figure 1:
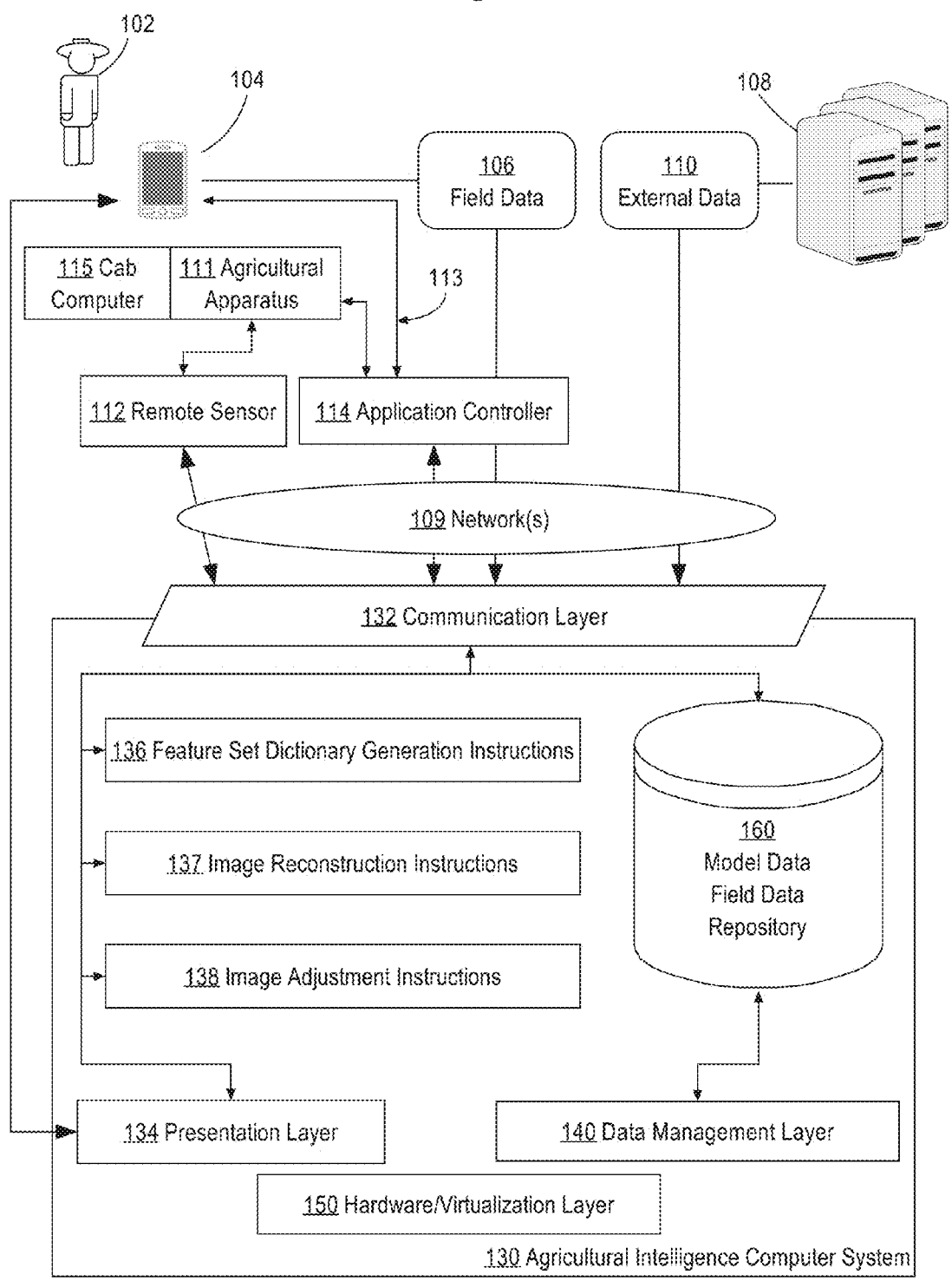
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. SYNTHESIZING HIGH RESOLUTION IMAGES FROM LOW RESOLUTION IMAGES
   3.1. GENERATING THE FEATURE SET DICTIONARY
   3.2. GENERATING HIGH RESOLUTION IMAGES USING THE FEATURE SET DICTIONARY
   3.3. ADJUSTING GENERATED IMAGES USING A RECENT HIGH RESOLUTION IMAGE
   3.4. NON-IMAGE APPLICATIONS
   3.5. NEURAL NET EMBODIMENTS
4. BENEFITS OF CERTAIN EMBODIMENTS
5. EXTENSIONS AND ALTERNATIVES

1. General Overview

Aspects of the disclosure generally relate to computer-implemented techniques for generating images of a particular type based on images of a different type and a feature set dictionary. In an embodiment, an agricultural intelligence computer system receives a first plurality of images of a first type and a second plurality of corresponding images of a second type. The agricultural intelligence computer system generates a feature set dictionary comprising feature sets that can be used to generate pixel sets of the first plurality of images and a mapping to feature sets that can be used to generate pixel sets of the second plurality of images. The mapping may include location of values in corresponding matrices. When the agricultural intelligence computer system receives an image of the first type, each pixel set of the image is broken down into features from the first plurality of images. The agricultural intelligence computer system then identifies corresponding features of the second plurality of images and generates an image of the second type using pixel sets generated from the identified corresponding features.

In an embodiment, a method comprises receiving a first plurality of images at a first image resolution and a second plurality of images at a second image resolution, wherein the first image resolution is lower than the second image resolution; for each image of the first plurality of images: transforming the image into a transformed image of the second image resolution; identifying a plurality of first image pixel sets comprising a plurality of pixels of the transformed image; identifying, for each first image pixel set, a corresponding second image pixel set of the second plurality of images; and storing each first image pixel set and each corresponding second image pixel set in a database repository of corresponding image pixel sets; based on the first image pixel sets in the database repository of corresponding image pixel sets, computing a plurality of first image pixel set features, wherein each first image pixel set may be computed as a linear combination of a subset of the plurality of first image pixel set features; based on the first image pixel set features for each first image pixel set and corresponding second image pixel set, computing a corresponding plurality of second image pixel set features, wherein each first image pixel feature corresponds to a second image pixel set feature of the corresponding plurality of second image pixel set features, and wherein each second image pixel set may be computed as a linear combination of a subset of the plurality of second image pixel set features and each second image pixel feature of the subset corresponds to a first image pixel feature in the subset of the plurality of first image pixel set features for the first image pixel set that corresponds to the second image pixel set; storing, in a data record, each first image pixel feature and each corresponding second image pixel feature; receiving a first particular image at the first image resolution; transforming the first particular image from the first image resolution to the second image resolution; identifying a plurality of first particular image pixel sets of the transformed particular image; for each of the plurality of first particular image pixel sets: identifying a particular subset of the plurality of first image pixel set features such that the first particular image pixel set may be computed as a linear combination of the particular subset of the plurality of first image pixel set features; for each first image pixel set feature of the particular subset, identifying a corresponding second image pixel set feature; and computing a second particular image pixel set as a linear combination of the identified corresponding second image pixel set features; generating and displaying, on a computing device, a second particular image from the second particular image sets.

In an embodiment, a system comprises one or more processors and one or more non-transitory computer-readable storage media storing instructions which, when executed using the one or more processors, cause the one or more processors to perform: receiving a first plurality of images of a first type; receiving a second plurality of images of a second type; generating a feature set dictionary comprising mappings from features of the first plurality of images to features of the second plurality of images; receiving a first particular image of the first type; generating a second particular image of the second type using the first particular image and the feature set dictionary.

2. Example Agricultural Intelligence Computer System

2.1. Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
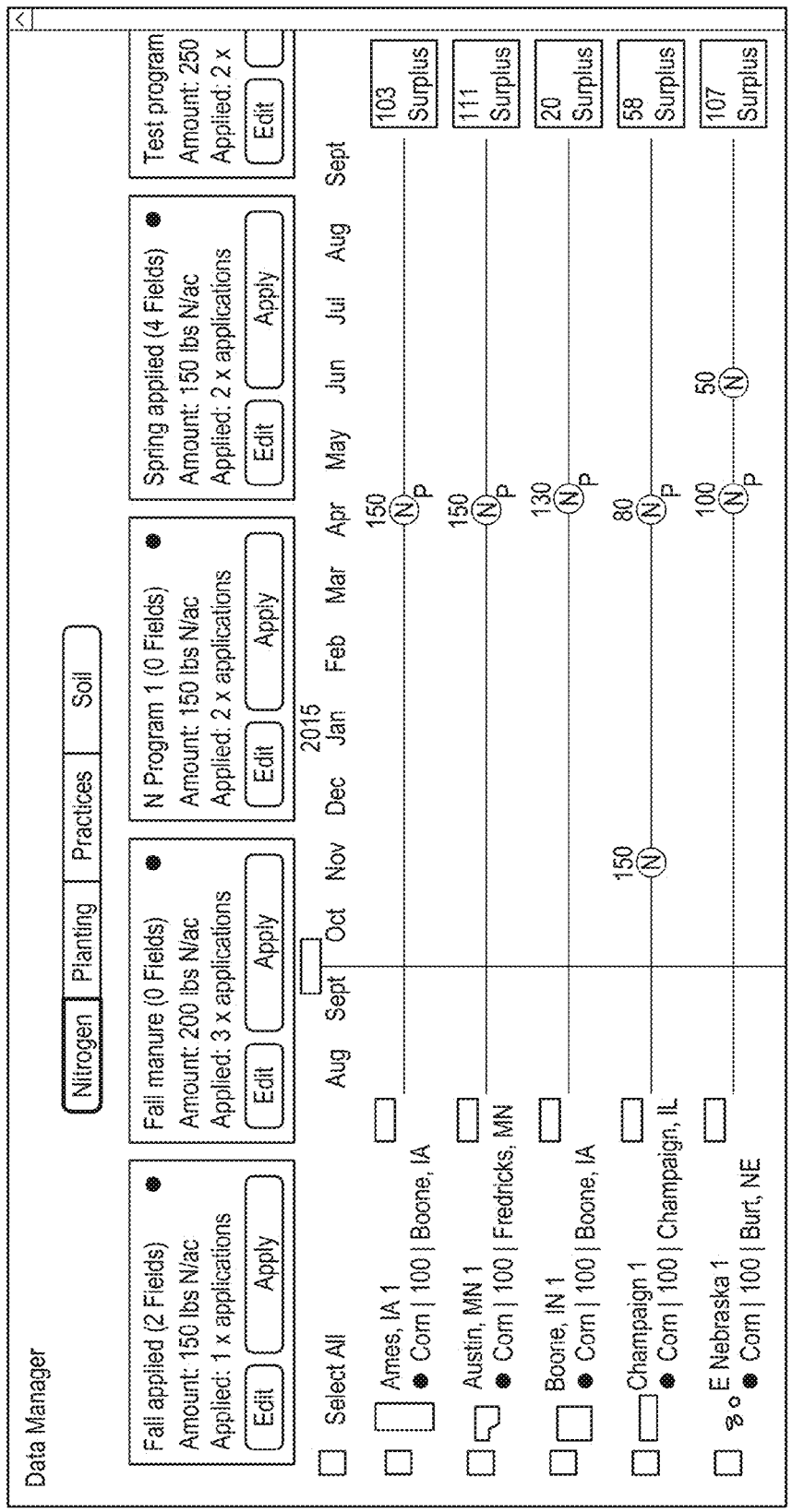
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

Figure 6:
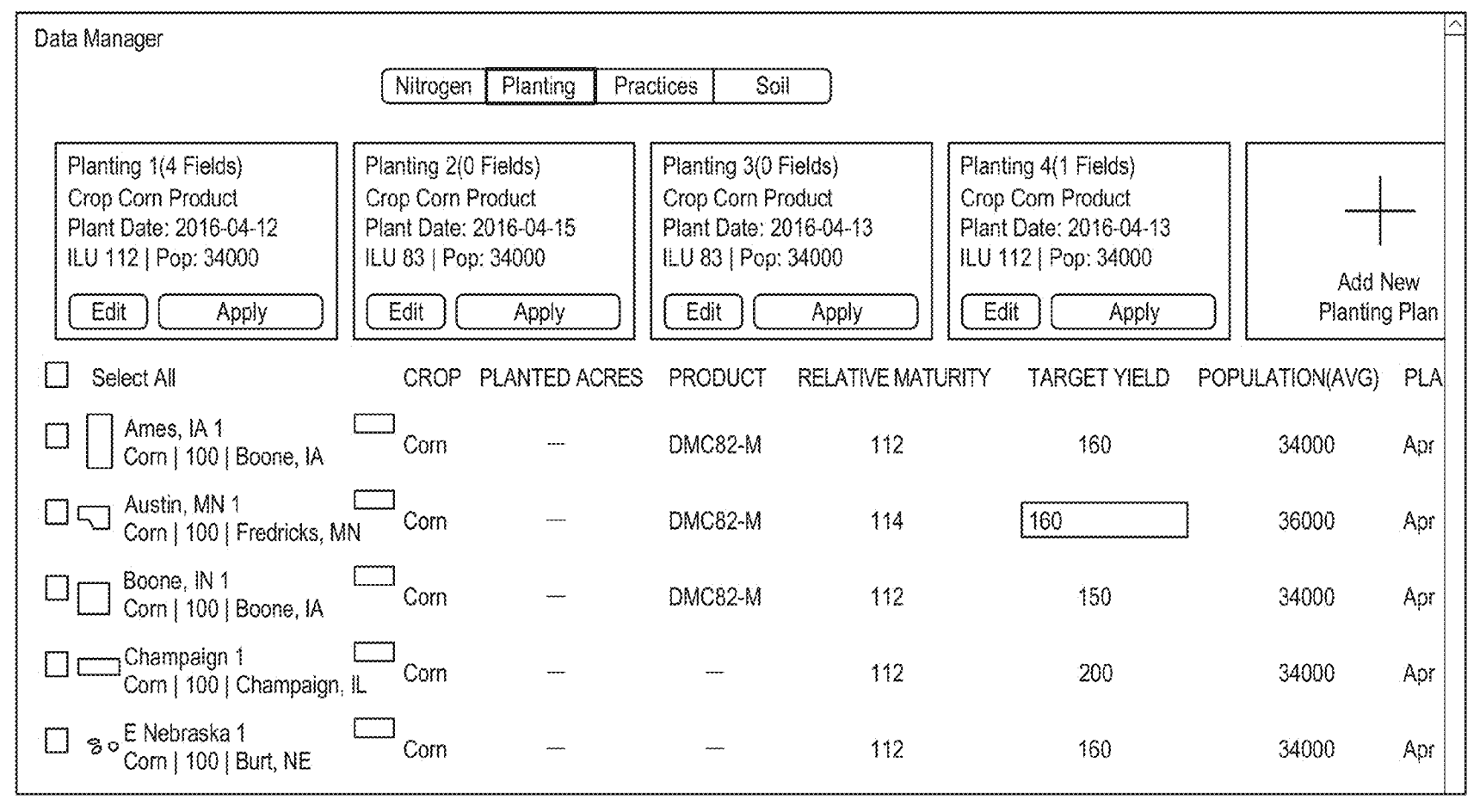

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Feature set dictionary generation instructions 136 comprise computer readable instructions which, when executed by one or more processors, cause agricultural intelligence computer system 130 to perform generation of a first plurality of feature set vectors from a first plurality of images and a second corresponding plurality of feature set vectors from a second plurality of images. Image reconstruction instructions 137 comprise computer readable instructions which, when executed by one or more processors, cause agricultural intelligence computer system 130 to perform computation of image pixel values and generation of an image from the image pixel values based on a corresponding image and a feature set dictionary. Image adjustment instructions 138 comprise computer readable instructions which, when executed by one or more processors, cause agricultural intelligence computer system 130 to perform computation of adjustments from one or more recent images and application of the adjustments to a generated image.

In an embodiment, each of feature set dictionary generation instructions 136, image reconstruction instructions 137, and image adjustment instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the nutrient modeling instructions 135 may comprise a set of pages in RAM that contain instructions which when executed cause performing the nutrient modeling functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of feature set dictionary generation instructions 136, image reconstruction instructions 137, and image adjustment instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
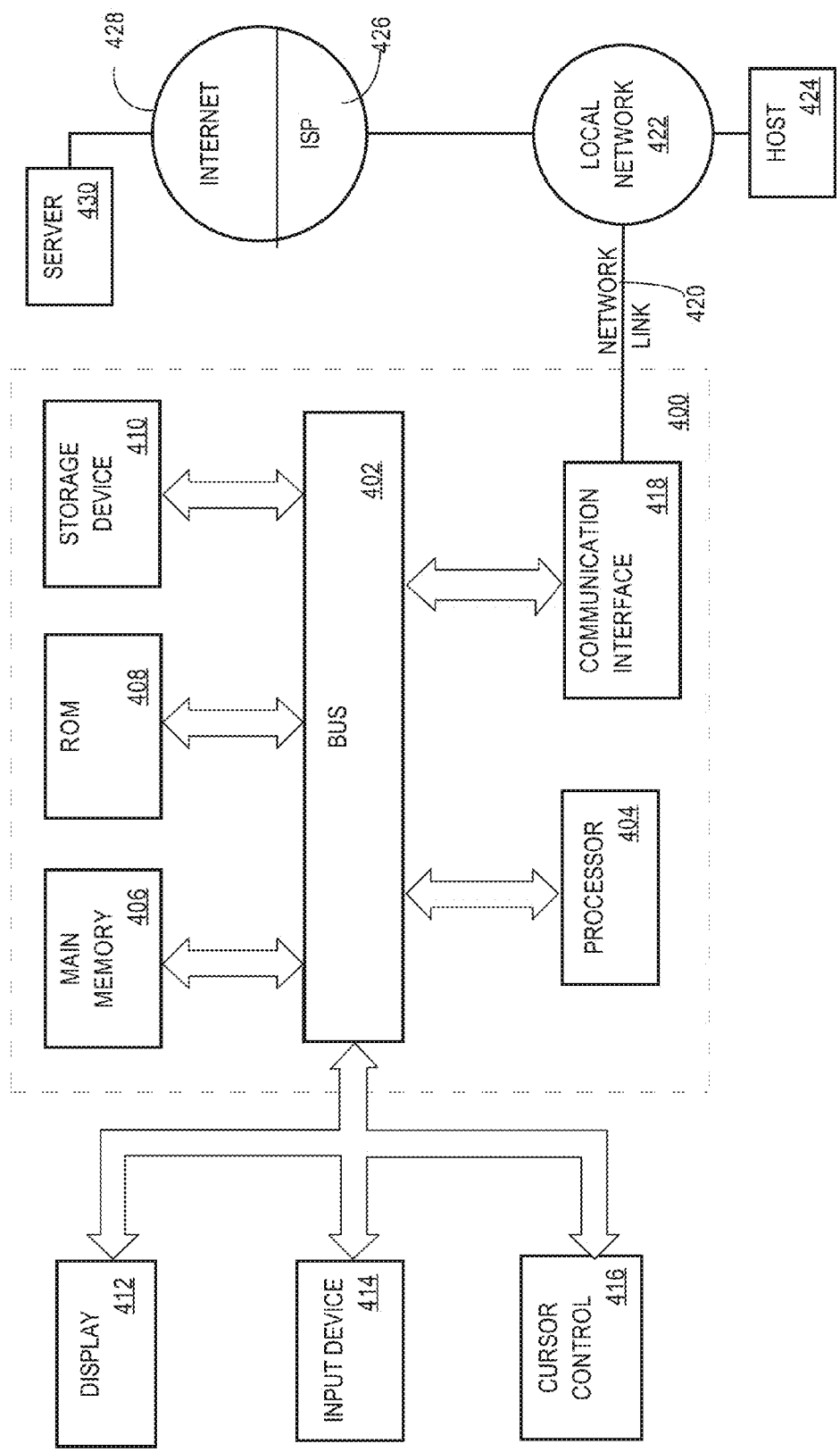
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes;

and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. No.

8,767,194 and U.S. Pat. No. 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
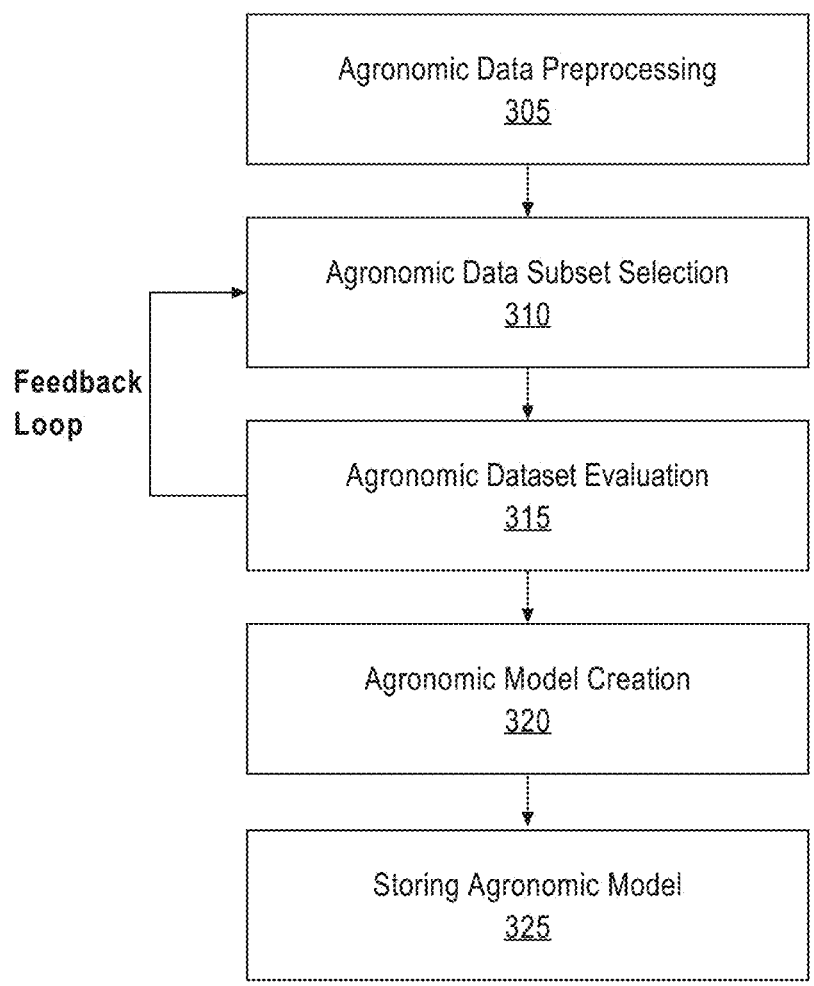
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Synthesizing High Resolution Images from Low Resolution Images

Figure 7A:
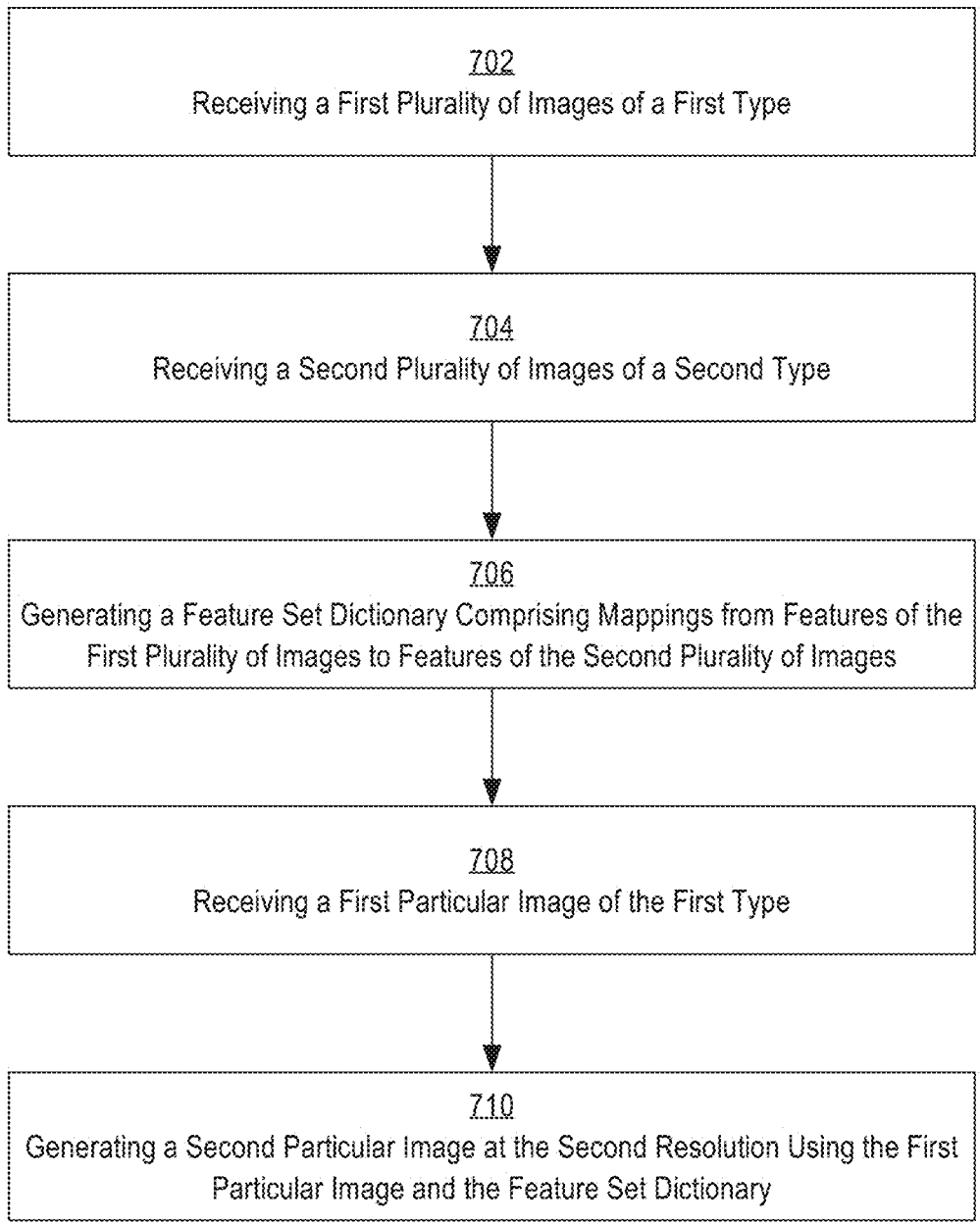
FIG. 7A is a flowchart that depicts a method of generating an image feature set dictionary from image pairs and using the image feature set dictionary to generate an image of a second type from an image of a first type.

FIG. 7A is a flowchart that depicts a method of generating an image feature set dictionary from image pairs and using the image feature set dictionary to generate an image of a second type from an image of a first type.

At step 702, a first plurality of digital images of a first type are received. At step 704, a second plurality of digital images of a second type are received. Receiving may comprise retrieving from stored digital databases, executing networked calls to an application programming interface (API) to access a server that is storing the digital images, or other techniques. In any case, the digital images are received in the form of stored digital data that is transmitted over networks and transiently stored in computer memory for processing. In an embodiment, the first plurality of images is received from a first source and the second plurality of images is received from a second source. The first plurality of images and the second plurality of images may be satellite images taken by different satellites operated by one or more sources. Example satellites include the Landsat 8 satellite operated by the United States Geological Survey, the Deimos-1 satellite operated by Deimos Imaging, and the RapidEye satellites operated by BlackBridge AG. In an embodiment, the first type comprises a first image resolution and the second type comprises a second image resolution which is higher than the first image resolution.

In an embodiment, each image of the first plurality of images corresponds to an image of the second plurality of images to create a pair of matching images. As an example, the first plurality of images may originate from the Landsat 8 satellite and the second plurality of images may originate from the RapidEye satellites. Each image may be a satellite image of one or more locations. For example, each satellite may produce images of field locations across the globe. Satellite images from each satellite that corresponds to a particular location within a particular time period may be matched together. For example, satellite images may identify particular locations through latitude and longitude, the Universal Transverse Mercator system, and/or the Universal Polar Stereographic system. Satellite images for each source that overlap in coordinates may be identified and the overlapping portions may be identified for use generating the feature set dictionary.

In an embodiment, the pair of matching images comprises images taken within a particular time period of each other. For example, two satellites may not necessarily produce images of a particular location on the same day as each other. Thus, a particular period of two days may be set such that an image of the first plurality of images only corresponds to an image of the second plurality of images that was taken within two days of the image of the first plurality of images. Additionally and/or alternatively, agricultural intelligence computer system 130 may be programmed or configured to identify, for each particular image of the second plurality of images, an image from the first source which was taken closest in time to the particular image. For example, images from the second source, e.g. images of a higher resolution images, may be available less frequently than the images from the first source. Thus agricultural intelligence computer system 130 may receive less images from the second source than from the first source. For each image from the second source, agricultural intelligence computer system 130 may be programmed or configured to identify an image from the first source of the same location which was taken closest in time to the image from the second source.

In an embodiment, the first plurality of images is generated using a first plurality of frequency bands and the second plurality of images is generated using a second plurality of frequency bands. A frequency band, as used herein, refers to a range of frequencies of light used to capture an image. For example, a blue frequency band may comprise frequencies of 440-510 nm. In an embodiment, each frequency band of the second plurality of frequency bands corresponds to a frequency band of the first plurality of frequency bands. For example, each source of images may produces images using a blue frequency band, a green frequency band, a red frequency band, a near infrared frequency band, and/or an infrared frequency band. In an embodiment, corresponding frequency bands comprise the same range of frequencies. For example, blue frequency bands for both the first plurality of images and the second plurality of images may be in the range of 440-510 nm.

In an embodiment, the first type comprises a first set of ranges for a first set of frequency bands and the second type comprises a second set of ranges for a corresponding set of frequency bands wherein at least one of the first set of ranges of the first set of frequency bands is different than a corresponding second range of the corresponding second set of frequency bands. As various satellites may be operated by various sources, the frequency bands used for each source may vary. The methods described herein may be used to synthesize an image comprising a particular frequency band that is based on images comprising a corresponding frequency band with different ranges of frequencies. For example, a blue frequency band used for the first plurality of images may comprise frequencies of 440-510 nm while a blue frequency band used for the second plurality of images may comprise frequencies of 450-515 nm. The feature set dictionary, described further herein, may thus relate images using the frequencies of 440-510 nm to images using the frequencies of 450-515 nm.

The benefits of generating a synthesized image through a feature set dictionary as described herein may thus be applied to two images that utilize different frequency ranges for corresponding frequency bands, thus allowing agricultural intelligence computer system 130 to provide only images using a single set frequency ranges for displaying or for future modeling. For example, if agricultural intelligence computer system 130 continuously receives images from different satellites using different, but corresponding frequency bands, the received images would appear to contain differences based on variances in the fields, but the differences may actually relate to the satellite used to produce the images. By generating images with particular frequency ranges for each frequency band, agricultural intelligence computer system 130 reduces and/or eliminates variability based on used frequencies. The reduction and/or elimination of variability further allows agricultural intelligence computer system 130 to model particular values in the field, such as soil moisture and/or nutrient stress of a crop, based on images received from different satellite sources.

In an embodiment, the first type comprises a first set of frequency bands and the second type comprises a second set of frequency bands wherein at least one frequency band of the second set of frequency bands does not have a corresponding frequency band in the first set of frequency bands. For example, the second plurality of images may include images produced with a blue frequency band, a green frequency band, a red frequency band, and a near infrared frequency band while the first plurality of images includes images produced with only the green, red, and near infrared frequency bands. Agricultural intelligence computer system 130 may thus utilize the methods described herein to generate an image that reconstructs a frequency band, such as the missing blue frequency band, from an image lacking the blue frequency band and a feature set dictionary.

Additionally and/or alternatively, agricultural intelligence computer may construct images with less or different frequency bands. For example if the first plurality of images includes a blue frequency band, but no green frequency band and the second plurality of images includes a green frequency band, but no blue frequency band, agricultural intelligence computer system 130 may use the methods described herein to construct an image with a green frequency band from an image with a blue frequency band.

Figure 10:
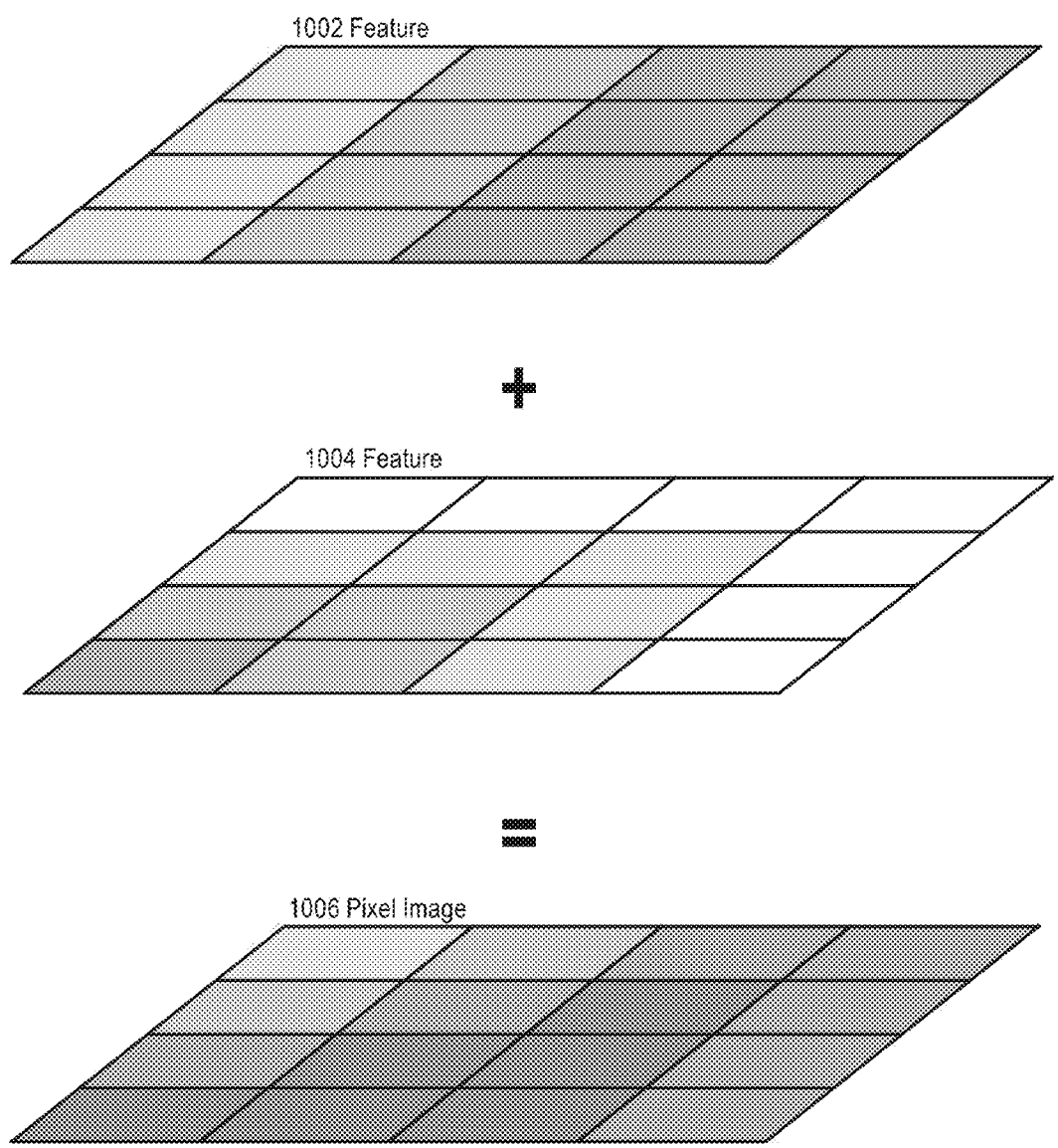
FIG. 10 depicts an example of a pixel image generated from two different features.

At step 706, a feature set dictionary comprising mappings from features of the first plurality of images to features of the second plurality of images is generated. A feature, as used herein, refers to an underlying pattern of a plurality of underlying patterns in a set of pixels. FIG. 10 depicts an example of a pixel image generated from two different features. Feature 1002 and feature 1004 are both underlying patterns which may be used to generate a particular image. Both feature 1002 and feature 1004 comprise a four-by-four grid of pixels, each with a unique set of pixel value. The size of the features, i.e. the number of pixels in the grids used to generate the feature set dictionary, may be predetermined. For example, agricultural intelligence computer system 130 may be configured to generate a feature set dictionary using grids that are twenty-by-twenty pixels.

In an embodiment, features in the feature set dictionary may comprise one or more pixels comprising a plurality of pixel values. For example, if an image is generated with four frequency bands, e.g. a blue, green, red, and infrared band, a particular pixel in a feature may be capable of having anywhere between zero and four pixel values.

A combination of feature 1002 and feature 1004 generate pixel image 1006. While FIG. 10 depicts an image generated from two features, embodiments may include any number of features used to generate a particular image. For example, images may be made up of ten to twelve different features, each of which comprise one or more pixel values for one or more pixels in the feature.

In an embodiment, the feature set dictionary comprises a plurality of mappings of image features from the first source to images features from the second source. Agricultural intelligence computer system 130 may use corresponding grids from the first plurality of images and the second plurality of images to identify features in the first plurality of images that correspond to features in the second plurality of images. The features are then stored in the feature set dictionary such that each feature from the first plurality of images is associated with a feature from the second plurality of images. Generation of the image feature set dictionary is described in more detail in Section 3.1, FIG. 7B and the associated text.

At step 708, a first particular image of the first type is received. For example, agricultural intelligence computer system 130 may receive a satellite image of a particular location from the first source. In embodiments, the first type may be a first range of frequency bands, a set of frequency bands, and/or a first image resolution.

At step 710, a second particular image of the second type is generated using the first particular image and the feature set dictionary. For example, agricultural intelligence computer system 130 may be programmed or configured to identify features in a plurality of grids of pixels in the first particular image which correspond to features in the feature set dictionary. Agricultural intelligence computer system 130 may then translate the identified features into corresponding features based on the mappings in the feature set dictionary. The translated features may then be aggregated to create a second particular image. Generating images of a second type is describe in more detail in Section 3.2, FIG. 7C and the associated text.

Figure 8:
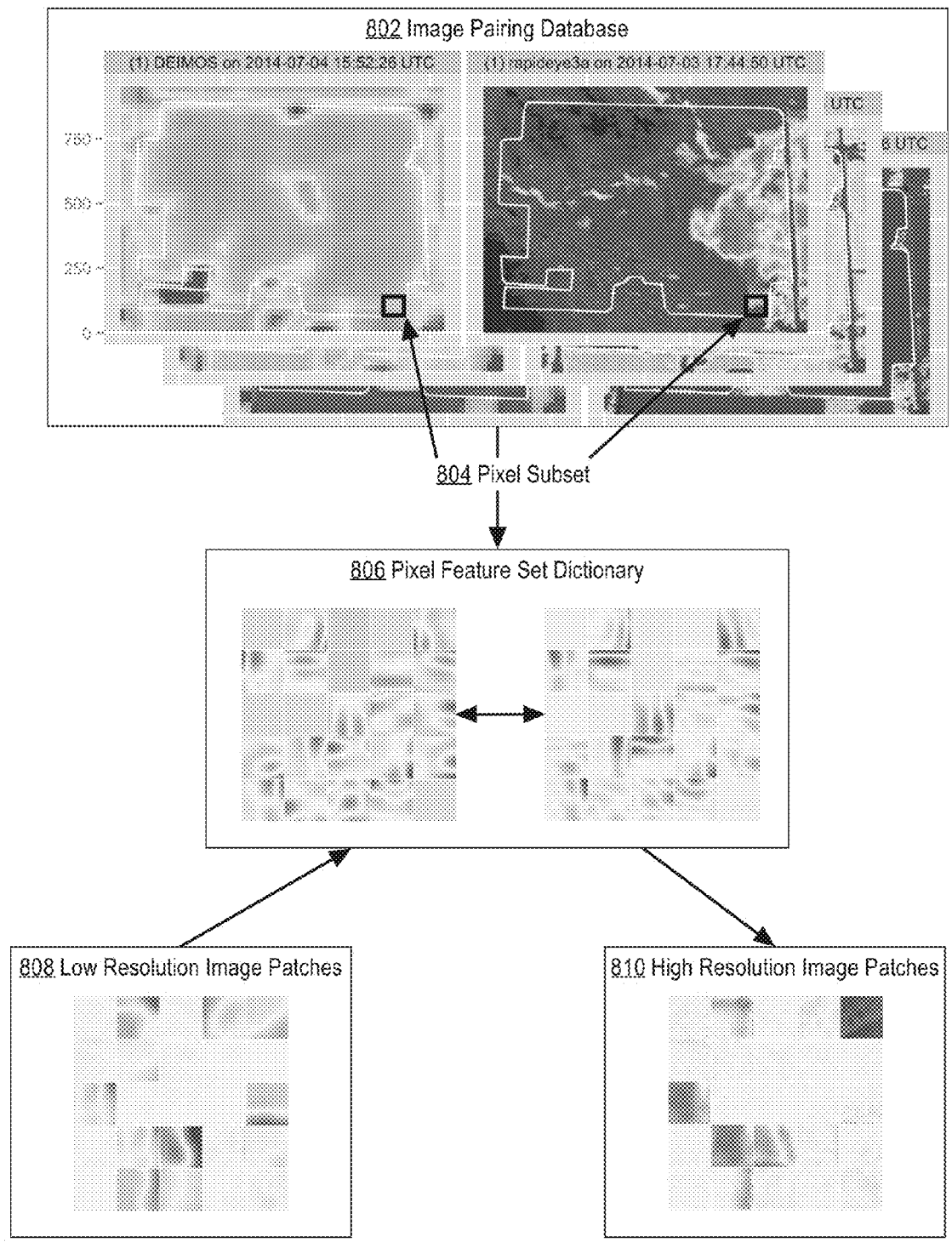
FIG. 8 depicts the generation of a pixel feature set dictionary from a plurality of corresponding images and using the pixel feature set dictionary to generate high resolution image patches from low resolution image patches.

FIG. 8 depicts the generation of a pixel feature set dictionary from a plurality of corresponding images and using the pixel feature set dictionary to generate high resolution image patches from low resolution image patches. In FIG. 8, an image pairing database 802 is generated using images of the same field from two different sources. Each image pairing in the image pairing database includes a corresponding plurality of pixel subsets, such as pixel subset 804. Based on the corresponding subsets, a pixel feature set dictionary is generated that includes features from both images that correspond to each other. For example, the first grouping of pixels in the leftmost set of features corresponds to the first grouping of pixels from the rightmost set of features. When low resolution image patches 808 are received, the pixel feature set dictionary is used to translate them into high resolution image patches 810 which may then be used to generate a high resolution image.

3.1. Generating the Feature Set Dictionary

Figure 7B:
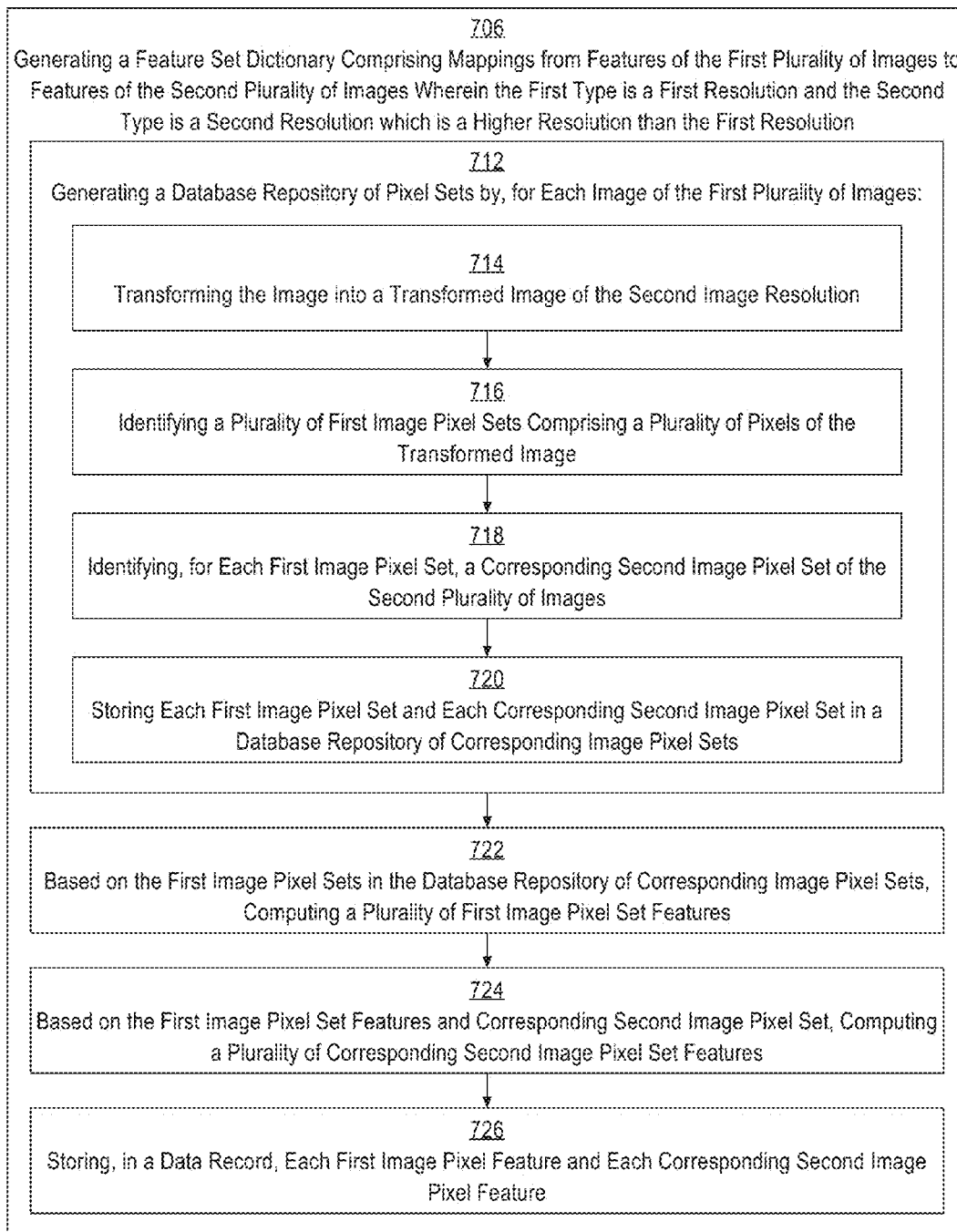
FIG. 7B depicts a method of generating a feature set dictionary comprising mappings from features of the first plurality of images to features of the second plurality of images.

FIG. 7B depicts a method of generating a feature set dictionary comprising mappings from features of the first plurality of images to features of the second plurality of images. While FIG. 7B depicts a method of generating a feature set dictionary based on low and high resolution images, the same methods may be applied to images of different types, such as range of frequency bands, without differences in resolution. Thus, the method of 7B may be performed without step 714 if both images are of the same resolution.

At step 712, a database repository of pixel sets is generated by performing the method of steps 714-720 for each image of the first plurality of images.

At step 714, the first image is transformed into a transformed image of the second image resolution. If the first plurality of images is of a lower resolution than the second plurality of images, generating the pixel feature set dictionary may comprise adjusting the resolution of the first plurality of images to match the resolution of the second plurality of images. For example, agricultural intelligence computer system 130 may be programmed or configured to interpolate values of the pixels of the first image of a pair to a grid of the same resolution as the second image, such as by using bicubic interpolation or linear interpolation.

At step 716, a plurality of first image pixel sets comprising a plurality of pixels of the transformed image is identified. Pixel sets may comprise a strict subset of the pixels in the transformed images. The strict subset may be a square grid, such as a five-by-five or twenty-by-twenty grid of connected pixels. Agricultural intelligence computer system 130 may be programmed or configured to identify pixel sets of a specific size in each image. Additionally and/or alternatively, agricultural intelligence computer system 130 may identify pixel sets of different sizes in each image in order to generate multiple dictionaries with differently sized feature sets.

In an embodiment, pixel sets identified by agricultural intelligence computer system 130 contain overlapping pixels. For example, agricultural intelligence computer system 130 may identify a first pixel set at pixel coordinates [0,0] to [20,20]. The next pixel set may be offset by one or more pixels from the first pixel set. Thus, agricultural intelligence computer system 130 may identify a second pixel set at pixel coordinates [2,0] to [22,20], an offset of two pixels from the first pixel set.

At step 718, a corresponding second image pixel set of the second plurality of images is identified for each first image pixel set. Using coordinates of the first image and the second image, agricultural intelligence computer system 130 may be configured or programmed to identify pixel sets in a corresponding second image which covers the same physical location as the pixel set in the first image. As the transformed first image is the same resolution as the second image, each pixel in the first image corresponds to an area that is the same size as a pixel in the second image. Thus, agricultural intelligence computer system 130 identifies corresponding pixel sets in the second image that cover the same location as the first image and contain the same number of pixels as the first image.

At step 720, each first image pixel set and each corresponding second image pixel set is stored in a database repository of corresponding image pixel sets. Agricultural intelligence computer system 130 may store the image pixel sets as arrays of pixel values. For example, if an image pixel set comprises four frequency bands, agricultural intelligence computer system 130 may store four arrays of values indicating pixel values at each of the four frequency bands. Corresponding pixel sets may be stored in a single data record such that corresponding pixel values between pixel sets may be mapped to each other. For example, a collection of image pixel sets from the first plurality of images and the second plurality of images may be defined as $\{z_i^{(f)}, z_i^{(s)}\}_{i=1}^n$, where $z_1^{(f)}$ is a vector comprising an image pixel set from the first plurality of images and $z_1^{(s)}$ is a corresponding vector comprising a corresponding image pixel set from the second plurality of images.

In some embodiments, agricultural intelligence computer system 130 separates the vectors into frequency bands and generates image pixel sets for each individual frequency band. Alternatively, in order to preserve relationships between different frequency bands, agricultural intelligence computer system 130 may be programmed or configured to generate each vector $z_i^{(f)}$ and $z_i^{(s)}$ as a stacked vector including each frequency band. For example, $z_i^{(f)}$ may be an m×n dimensional matrix where m is the number of pixels in a pixel set and n is the number of frequency bands in the first source. Thus, for a first source which produces images from blue, green, red, and near infrared frequency bands, each vector may comprise:

$$z_i^{(f)} = [z_i^{(f,blue)}, z_i^{(f,green)}, z_i^{(f,red)}, z_i^{(f,NIR)}].$$

In an embodiment, pixel values in the image pixel sets from a single source are scaled to have a mean of zero and a standard deviation using a single set of centering and scaling values. For example, the first plurality of images may have all pixel values for each frequency band scaled down using a single centering and scaling value. The second plurality of images may be scaled using a different centering and scaling value. By using a single set of centering and scaling values for each source of images, agricultural intelligence computer system 130 preserves each quantity of interest and relationships between the different frequency bands in the images. Agricultural intelligence computer system 130 may further store the single set of centering and scaling values used for the first plurality of images and the single set of centering and scaling values used for the second plurality of images in the database repository. The stored centering and scaling values may then later be used to convert newly received images to the same centering and scaling as the stored images.

At step 722, a plurality of first image pixel set features is computed based on the first image pixel sets in the database repository of corresponding image pixel sets. Agricultural intelligence computer system 130 may define a plurality of first image pixel set features such that each of the first image pixel sets may be computed as a linear combination of a subset of the first image pixel set features. For example, the database repository may store thousands of image pixel sets with a large number of them being less useful or redundant. By extrapolating image pixel set features from the image pixel sets, agricultural intelligence computer system 130 is able to reduce long term storage to the image pixel set features. Additionally, agricultural intelligence computer system 130 saves on memory in generating images based on the lower number of image pixel set features. While the database repository may store thousands of image pixel sets, a feature set dictionary may store two hundred fifty image pixel feature sets which can be combined in various ways to generate each image pixel set in the database repository. For example, a particular image pixel set may be computed from a subset of ten of the two hundred fifty image pixel feature sets stored in the feature set dictionary.

In an embodiment, agricultural intelligence computer system 130 is programmed or configured to generate each image pixel feature set from the first plurality of images while minimizing a number of image feature sets used. For example, a penalty parameter $\lambda$ may be defined to limit the number of first image pixel set features in the image feature set dictionary, $D_f$, used to compute each image pixel set based on the following equation:

$$\min_{\alpha_1, \ldots, \alpha_n, D_f} \sum_{i=1}^{n} \left( \frac{1}{2} \left\| z_i^f - D_f \alpha_i \right\|_2^2 + \lambda \|\alpha_i\|_1 \right)$$

where $D_f$ is a matrix representing the image pixel feature sets from the first plurality of images and each $\alpha_i$ is a vector of values which selects particular columns of the matrix $D_f$ and combines them into a linear combination to create a vector approximating the corresponding $z_i^f$. The feature set dictionary $D_f$ may be defined such that the $l_2$-norm of each column of D is constrained to be ≤1.

Additionally and/or alternatively, agricultural intelligence computer system 130 may be programmed or configured with a sparseness parameter L which minimizes the number of feature sets used to generate each $z_i^f$ using the following equation:

$$\min_{\alpha_1, \ldots, \alpha_n, D_f} \sum_{i=1}^{n} \left\| z_i^f - D_f \alpha_i \right\|_2^2 \text{ such that } \|\alpha_i\|_0 \leq L.$$

The penalty parameter $\lambda$ and/or the sparseness parameter L may be used as tuning parameters along with the size of the dictionary. Thus, as the penalty parameter $\lambda$ increases or the sparseness parameter L decreases, the size of the dictionary increases. The minimizations described above may be computed using available algorithm packages, such as the LARS algorithm or K-SVD algorithm supplied in the SPAMS toolbox.

At step 724, a corresponding plurality of second image pixel set features is computed based on the first image pixel set features and the corresponding second image pixel set. The second image pixel set features are computed such that each second image pixel set feature corresponds to a first image pixel set feature and each second image pixel set is computed from only the image pixel set features that correspond to first image pixel set features used to compute the corresponding first image pixel set. For example, the second image feature sets in the feature set dictionary $D_s$ may be computed as:

$$\min_{D_s} \sum_{i=1}^{n} \|z_i^s - D_s \hat{\alpha}_i\|_2^2$$

where $\hat{\alpha}_1, \ldots, \hat{\alpha}_n$ are the $\alpha_i$'s that were used to minimize the above equations. Thus, as each $\alpha_i$ is the same for each first image pixel set and its corresponding second image pixel set, only corresponding columns/feature sets from the feature set dictionary will be used to compute the first image pixel set and the corresponding second image pixel set. Given that the computation of the second image pixel set features is based on the $\alpha_i$'s used for the first image pixel feature sets, the minimization only needs to take into account the values in $D_s$. The minimization may be computed using least-square regression.

At step 726, each first image pixel feature and each corresponding second image pixel feature is stored in a data record. For example, $D_f$ and $D_s$ may be stored in a single data record for use in translating images of the first type into images of the second type. Agricultural intelligence computer system 130 may additionally store the scaling and centering values for each source in the data record, thereby obviating the need to store the prior image pixel sets.

In an embodiment, a plurality of feature set dictionaries are generated. For example, feature set dictionaries may be generated based on geographic location in order to capture patterns between two sources that shift with geographic locations. Thus, when a particular image is received from the first source, agricultural intelligence computer system 130 may be programmed or configured to identify a location associated with the particular image and to use the feature set dictionary associated with that location.

Additionally, feature set dictionaries may be generate for a plurality of different sources. For example, agricultural intelligence computer system 130 may be programmed or configured to generate feature set dictionaries that map images received from Landsat 8 and Deimos-1 to images received from RapidEye. Thus, a first feature set dictionary may map images received from Landsat 8 to images received from RapidEye while a second dictionary maps images received from Deimos-1 to RapidEye.

3.2. Generating High Resolution Images Using the Feature Set Dictionary

Figure 7C:
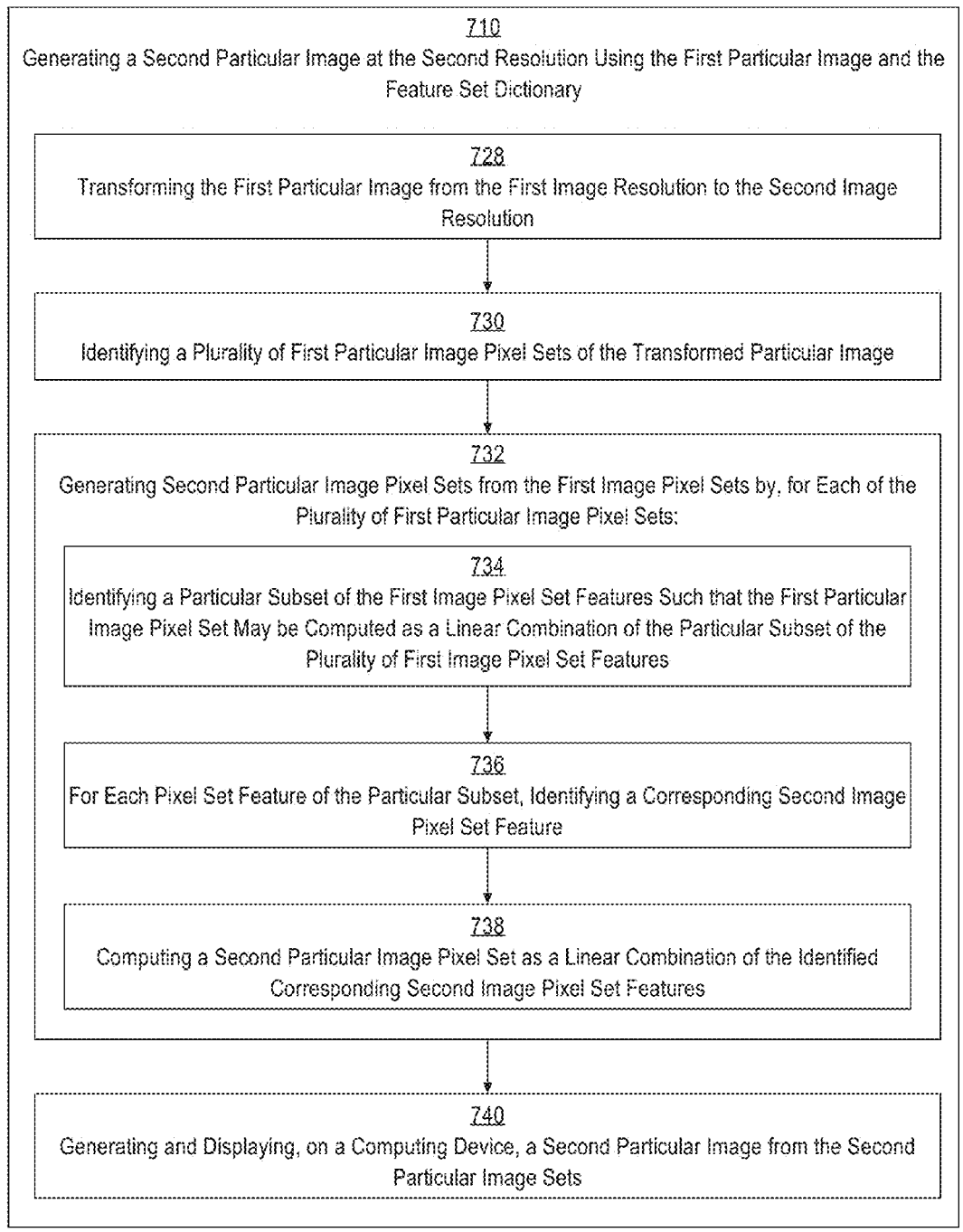
FIG. 7C depicts a method of generating a second particular image at the second resolution using a first particular image and the feature set dictionary.

FIG. 7C depicts a method of generating a second particular image at the second resolution using the first particular image and the feature set dictionary.

At step 728, the first particular image is transformed from the first image resolution to the second image resolution. In an embodiment, the first particular image undergoes the same transformations as the first plurality of images. For example, the same methods of interpolation may be applied to the first particular image as was applied to the first plurality of images. Additionally and/or alternatively, the stored scaling and centering values may be applied to the image so that the range of values of the first particular image matches the range of values of the first plurality of images. In embodiments where the first source is the same resolution as the second source, such as when the differences in sources are the number of frequency bands and/or range of values for each frequency band, step 728 may be unnecessary as the two images are already of the same resolution.

At step 730, a plurality of first particular image pixel sets of the transformed particular image are identified. For example, agricultural intelligence computer system 130 may be programmed or configured to separate the first particular image into pixel sets of the same size as the pixel sets used to generate the pixel set feature dictionary. In an embodiment, the plurality of first particular image pixel sets comprises overlapping image pixel sets. The overlapping image pixel sets may be generated selecting image pixel sets offset by a number of pixels less than the size of the image pixel set. For example, image pixel sets of five pixels by five pixels may be offset by two pixels, such that the third and fourth pixels of a first pixel set comprises the first and second pixels of a second pixel set.

At step 732, second particular image pixel sets are generated from the first image pixel sets by performing the method of steps 734-738 for each of the plurality of first particular image pixel sets.

At step 734, a particular subset of the first image pixel set features is identified such that the first particular image pixel set may be computed as a linear combination of the features in the particular subset of the plurality of first image pixel set features. For example, given the image feature set dictionary, D, agricultural intelligence computer system 130 may be programmed or configured to identify a value for the vector $\alpha$ which satisfies the equation:

$$\min_{\alpha} \|z - D_f \alpha\|_2^2 \text{ such that } \|\alpha\|_0 \leq L$$

where L is a constraint on the number of non-zero elements of $\alpha$. For example, if L is set at ten, then only ten feature sets may be selected from the feature set dictionary in order to approximate the pixel set.

At step 736, for each pixel set feature of the particular subset, a corresponding second image pixel set feature is identified. At step 738, a second particular image pixel set is computed as a linear combination of the identified corresponding second image pixel set features. For example, for each first particular image pixel set, the same $\alpha$ may be used to compute a corresponding second image set from corresponding second image pixel set features in the feature set dictionary, $D_s$. Thus, each second particular image pixel set may be computed as $$z = D_s \alpha$$

where each second image pixel set z is computed for the same location as the corresponding first particular image pixel set and each $\alpha$ is the alpha used for the corresponding first particular image pixel set.

In an embodiment, the image patches may be uncompressed and separated back into individual frequencies. For example, the feature set dictionary may be generated using frequency bands that are stacked on top of each other such that the feature sets relate a plurality of frequency bands from the first set of images to a plurality of frequency bands from the second set of images. Thus, each second particular image pixel set may comprise a plurality of stacked frequency bands. Agricultural intelligence computer system 130 may separate the stacked bands into a plurality of frequency bands such that each frequency band may be adjusted individually.

Stacking the frequency bands on top of each other allows agricultural intelligence computer system 130 to generate images with higher accuracy, as each pixel value for each frequency band in the second plurality of images is correlated to a plurality of frequency bands from the first plurality of images. Thus, instead of generating green feature sets from only green bands, agricultural intelligence computer system 130 may be programmed or configured to generate the feature set dictionary with feature sets comprising values for each frequency band of the first plurality of images and corresponding feature sets with values for each frequency band of the second image plurality of images.

By stacking frequency bands, agricultural intelligence computer system 130 is further able to construct frequency bands in the second particular image that do not have a corresponding frequency band in the first plurality of images. For example, if the first plurality of images does not contain a blue frequency band but the second plurality of images does, the image feature set dictionary for the second image feature sets, $D_s$, would contain values for the blue frequency band even though the corresponding first image feature sets, $D_f$, would not. Thus, when agricultural intelligence computer system 130 receives the first particular image which does not include the blue frequency band, the constructed second particular image pixel sets would include the blue frequency band as constructed from the second image feature sets.

In an embodiment, generating the second particular image sets further comprises un-scaling and un-centering the computed image pixel sets. For example, in some embodiments, each frequency band of the second plurality of images is scaled and centered such that the values are shifted to be between the ranges of [−1,1]. Agricultural intelligence computer system 130 may be programmed or configured to store the values used to scale and center the images and to access said values in order to reconstruct each frequency band in the second particular image.

In an embodiment, generating the second particular image sets further comprises computing one or more values for each pixel based on a plurality of values. For example, agricultural intelligence computer system 130 may generate overlapping image pixel sets for the second particular image based on overlapping image pixel sets in the first particular image. Thus, a single pixel may contain a value for a particular frequency band from each of a plurality of overlapping pixel sets. Agricultural intelligence computer system 130 may be programmed or configured to reconcile different values pertaining to a single frequency for a particular pixel. For example, agricultural intelligence computer system 130 may compute the pixel value for a particular frequency band for each pixel as an average of all values received for the particular frequency band for the pixel. Thus, if a particular pixel appears in n different image pixel sets, the pixel value for a particular frequency may be computed as $$p = \frac{\sum_{i=1}^{n} p_i}{n}.$$

At step 740, a second particular image is generated and displayed on a computing device from the second particular image sets. Agricultural intelligence computer system 130 may be programmed or configured to generate an image using the pixel values computed in step 736 and display the pixel values on a computing device. The generated images may be used to compute particular values, such as crop growth or nitrogen stress values for a crop on the field. Additionally and/or alternatively, the generated images may be sent to field manager computing device 104.

Using the methods described herein, agricultural intelligence computer system 130 is programmed or configured to generate images of a particular type from images of a different type. Thus, if agricultural intelligence computer system 130 receives images of a single location from different satellites, the methods described herein may be used to reduce variability based on the source of the images. The methods described herein may further include benefits of producing images in a higher resolution from images of a lower resolution based on identified patterns. Additionally, the methods described herein may further include benefits of constructing image bands that are not available from a particular image source. Thus, if images are frequently available from a source which does not include a blue frequency band, agricultural intelligence computer system 130 may be programmed or configured to perform the method described herein to generate a blue frequency band for each received image.

3.3. Adjusting Generated Images Using a Recent High Resolution Image

Figure 9:
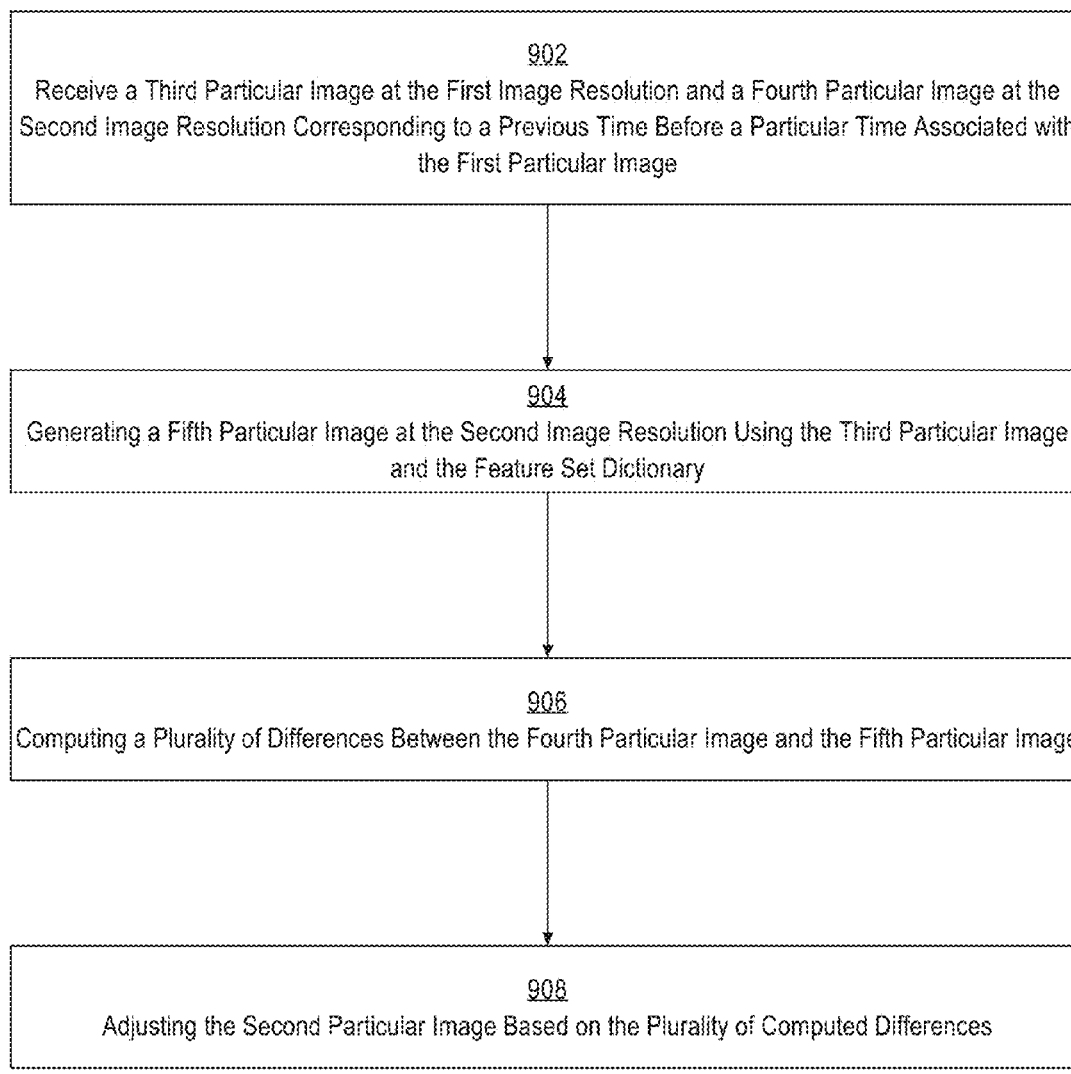
FIG. 9 depicts a method for adjusting a generated high resolution using a recently received high resolution image.

In an embodiment, images generated using the methods comprised herein are adjusted based on recently received images of the same type. FIG. 9 depicts a method for adjusting a generated high resolution using a recently received high resolution image. While FIG. 9 depicts the different types as low resolution versus high resolution, the same adjusting techniques may be applied to images containing different frequency bands and/or different ranges of frequency bands as well.

At step 902, a third particular image is received at the first image resolution and a fourth particular image is received at the second image resolution corresponding to a previous time before a particular time associated with the first particular image. Agricultural intelligence computer system 130 may be programmed or configured to identify the most recently received images of the second type, e.g. high resolution images, of a particular location associated with the first particular image. Thus, if agricultural intelligence computer system 130 generated an image of a particular field, agricultural intelligence computer system 130 may identify the most recent high resolution images of the field.

Agricultural intelligence computer system 130 may then identify a received image of the particular location of the first type, e.g. low resolution images, that is closest in time to the identified image of the location of the second type. For example, agricultural intelligence computer system 130 may reconstruct RapidEye images which are received once a month by using Landsat 8 images which are received multiple times a week. For a particular generated RapidEye image, agricultural intelligence computer system 130 may identify the most recently received RapidEye image and a corresponding Landsat 8 image which was taken at a time close to that of the RapidEye image.

At step 904, a fifth particular image is generated at the second image resolution using the third particular image and the feature set dictionary. For example, agricultural intelligence computer system 130 may use the feature set dictionary and the method of FIG. 7C to generate an image of the second type from the third particular image of the first type.

At step 906, a plurality of differences are computed between the fourth particular image and the fifth particular image. The fourth particular image, i.e. the received image of the second type, may be compared with the fifth particular image, i.e. the generated image of the second type, in order to find differences between the two images. The differences between the two images may be used to adjust the second particular image. By adjusting the second particular image based on differences between a received image and a generated image, agricultural intelligence computer system 130 reduces systematic errors in the reconstruction techniques. Additionally, by adjusting based on differences between the received image and the generated image from a recent time, agricultural intelligence computer system 130 reduces temporal errors, such as ones caused by correlations between images of the two types that change over time.

At step 908, the second particular image is adjusted based on the plurality of computed differences.

In an embodiment, the differences between the fourth particular image and the fifth particular image are directly added to the second particular image. For example, if the generated image includes a pixel that is 5 nm lower in value than the corresponding pixel in the received image, agricultural intelligence computer system 130 may be programmed or configured to reduce the pixel value of the corresponding pixel in the second particular image by 5 nm. In another embodiment, agricultural intelligence computer system 130 weights the computed differences, such as by using the following equation:

$$z_{adjust} = z_{gen} + w(z_{prior/actual} - z_{prior/gen})$$

where $z_{adjust}$ is the adjusted image, $z_{gen}$ is the generated second particular image, $z_{prior/actual}$ is the received image of the second type at a previous time and $z_{prior/gen}$ is the generated image of the second type at the previous time. In the above equation, w is a weighting parameter which may comprise the quotient of the generated second particular image with the prior generated image of the second type.

In an embodiment, agricultural intelligence computer system 130 further weights the computed differences by differences between a time associated with the generated image and a time associated with the prior received and generated images. For example, agricultural intelligence computer system 130 may compute the adjusted image as:

$$z_{adjust} = z_{gen} + \rho(\lambda + (1-\lambda)w)(z_{prior/actual} - z_{prior/gen})$$

where $\lambda$ is a further weighting parameter between [0,1] such that a fully relative adjustment, such as the one performed in the prior equation, is performed when $\lambda=0$ and an absolute adjustment is performed when $\lambda=1$. $\rho$ may comprise a parameter which controls the amount of adjustment based on the differences in time. $\rho$ may be parameterized as:

$$\rho = \exp\left(\frac{\log\left(\frac{1}{2}\right)(t_0 - t_1)}{\delta}\right)$$

where $\delta$ is a half-life parameter such that if $(t_0-t_1)=\delta$, then $\rho=\frac{1}{2}$. Generally, using $\rho$ as described above, agricultural intelligence computer system 130 assumes an exponential decay in the weight of the identified differences as a function of time. Agricultural intelligence computer system 130 may be programmed or configured to estimate parameters $\rho$ and $\lambda$ using the first plurality of images and the second plurality of images.

In an embodiment, agricultural intelligence computer system 130 adjusts the generated second particular image using only a prior received image of the second type. For example, agricultural intelligence computer system 130 may not have access to an image of the first type for a time in close proximity to that of the prior received image of the second type. If an image of the first type is unavailable to correspond to a prior received image of the second type, agricultural intelligence computer system 130 may generate an image of the first type from the image of the second type using the feature set dictionary.

As the feature set dictionary includes matrices for both the high resolution and low resolution images, generation of the image of the first type from an image of the second type may be performed in the same manner as generation of an image of the second type from an image of the first type without generating a new feature set dictionary. For example, each image feature set of the second type may be computed from image pixel sets of the prior received image of the second type using the following equation:

$$\min_{\alpha} \|z - D_s\alpha\|_2^2 \text{ such that } \|\alpha\|_0 \leq L$$

and each corresponding feature set of the first type may be identified as:

$$z = D_f\alpha.$$

Alternatively, a reverse feature set dictionary may be generated using the methods described herein, but with the images of the first type replaced with the images of the second type and vice versa. The reverse feature set dictionary may be utilized to generate an image of the first type from an image of the second type.

In embodiments where the first type is of a lower resolution than the second type, agricultural intelligence computer system 130 may be further programmed or configured to interpolate the generated image of the first type back to the resolution of the first type. General image smoothing techniques may be applied to smooth the images from the second image resolution, i.e. the higher resolution, to the first image resolution, i.e. the lower resolution.

Once an image of the first type has been generated for the prior image of the second type, agricultural intelligence computer system 130 may perform the method of FIG. 9, but using the generated image of the first type to correspond to the prior received image of the second type instead of a prior received image of the first type. Thus, agricultural intelligence computer system 130 may generate a high resolution image from the generated low resolution image and compare it to the prior received high resolution image in order to identify differences. Those differences may then be used to adjust the second particular image using any of the adjustment techniques described herein.

By generating a low resolution image to compare to the prior received high resolution image, agricultural intelligence computer system 130 may identify systematic errors in the transformation from the lower resolution to the higher resolution and additional differences not captured by the feature set dictionary. For example, the generated low resolution image, before the smoothing, will contain pixels with different values than an interpolated high resolution from the smoothed low resolution images due to approximations made in the interpolation steps. These differences may lead to identification of different feature sets and therefore a different high resolution image. The different high resolution image can thus be assumed to be an image that would have been produced from a received low resolution image and may thus be compared to the received high resolution image to identify systematic errors. Those errors may be used to correct the second particular image.

3.4. Non-Image Applications

In an embodiment, feature set dictionaries may be used to define relationships that include one or more non-image values. Embodiments described above include mapping feature sets of a first set of images to feature sets of a second set of images. In other embodiments, either the first set of images, the second set of images, or both sets of images may include one or more non-image values. As the image values for each band are translated into numerical values, additional non-image values may also be translated into numerical values for the purpose of generating a feature set dictionary.

As an example, the first set of values may include spectral image values at a particular period of a growing season for a particular field while the second set of values includes harvested yield values at the end of the growing season for the particular field. The harvested yield values may be normalized such that the mean of the normalized harvested yield values is zero and the standard deviation of the normalized harvested yield values matches the standard deviation of the image pixel values of the first plurality of images. Using the techniques described herein, a feature set dictionary may be generated which maps spectral image values at the particular period of the growing season with harvested yield values at the end of the growing season. With the feature set dictionary, a yield map comprising a prediction of harvested yield values for the field can be generated using images of the field at the particular period of the growing season.

In an embodiment, a feature set dictionary is generated by using image values and corresponding yield values from a plurality of fields. The use of values from a plurality of different fields allows for a more robust feature set dictionary at the cost of accuracy for a particular field based on inherent properties of the particular field. The accuracy cost may be mitigated or removed by using recent yield values from a particular field to adjust a generated prediction map for the field. For example, the agricultural intelligence computer system may identify a recent yield map for the particular field and a corresponding set of image values for the particular field. Using the corresponding set of image values and the feature set dictionary, the agricultural intelligence computer system may generate a predicted yield map to compare to the recent yield map for the purpose of generating one or more adjustment values. The one or more adjustment values may then be applied to a recent predicted yield map to correct for any variations caused by location or time.

While the example described above refers to using images generated at a particular period of a crop's development, a feature set dictionary may additionally include a temporal component which comprises weights for the other values based on when the image is taken. For example, the first set of values may comprise image values for the blue, green, red, near infrared, and infrared frequencies of light as well as an additional values for time within the growing season. The time values in the feature set dictionary may include dependencies on the blue, green, red, near infrared, and infrared frequencies, thereby allowing the system to weight feature sets by a time within the growing cycle when the image is received. For example, spectral images at the beginning of the growing season may have less of an impact on the harvested yield than images further along into the growing season. Thus, time values from the first portion of the growing season may include weights that lower the impact of the images in generating the feature set dictionary.

Additionally, the first set of values may include one or more non-image values. For example, the first set of values may include values pertaining to a property of soil in the field at a particular period of time in the growth cycle of a crop. Thus, the first set of values may include an amount of organic matter in the soil while a second set of values includes a crop yield at harvest time. As discussed above, the organic matter values may be field and time period specific or may be generalized for different fields and/or time periods and then adjusted based on values for a particular field.

In embodiments, a combination of non-image values and image values may be used for either the first set of values, the second set of values, or both sets of values. For example, the first set of values may include an amount of organic matter and spectral image values. As another example, the second set of values may include higher resolution image values as well as a predicted yield map based one or more of the first values.

In an embodiment, the system uses multiple feature set dictionaries. For example, a first feature set dictionary may be used to generate high resolution images from low resolution images. A second feature set dictionary may be used to generate yield prediction values based on the high resolution images. When a low resolution image is received, the system may generate a high resolution image using the first feature set dictionary. Then, using the second feature set dictionary, the system may generate a high resolution yield prediction map from the high resolution image.

4. Benefits of Certain Embodiments

Using the techniques described herein, a computer can generate images that comprise properties of a particular type based on images that comprise properties of another type. For example, a computer system may generate images of a high resolution based on images of a low resolution which includes patterns specific to the type of image. For example, where general interpolation or smoothing techniques may interpolate a sudden shift between a fully green pixel to a pixel with no green pigment as a plurality of higher resolution pixels that shift in color linearly, the techniques described herein use prior patterns to identify the most likely rate of shift of the higher resolution pixels based on low resolution pixels. Thus, images generated using the techniques described herein will be more accurate with respect to actual high resolution images of the same location.

Additionally, the techniques described herein may be used to generate images with frequency bands and/or frequency ranges that are unavailable in current images. For example, given a feature set dictionary between images with no blue frequency band and images with a blue frequency band, a computing system may predict and generate a blue frequency band for images without a blue frequency band. The benefits of the present disclosure allow a computing device to produce high quality images with a consistent set of frequency bands, frequency ranges, and resolution using images from different sources which contain variations in one or more qualities of the image. For example, the use of the image feature set dictionary allows a computing device to correct for systematic differences between two satellite sources, such as differences in exact wavelength ranges used to produce the images and/or physical differences in the instruments used to produce the images.

5. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer system comprising:
one or more processors;
one or more non-transitory computer-readable storage media storing instructions which, when executed using the one or more processors, cause the one or more processors to perform:
receiving a first plurality of images of a first type;
receiving a second plurality of images of a second type;
for each image of the first plurality of images:
transforming the image into a transformed image of the second type;
identifying a plurality of first image pixel sets comprising a plurality of pixels of the transformed image;
identifying, for each first image pixel set, a corresponding second image pixel set of the second plurality of images;
storing each first image pixel set and each corresponding second image pixel set in a database repository of corresponding image pixel sets;
based on the first image pixel sets in the database repository of corresponding image pixel sets, computing a plurality of features of the first plurality of images, wherein each first image pixel set may be computed as a combination of a subset of the plurality of features of the first plurality of images;
based on the features of the first plurality of images for each first image pixel set and corresponding second image pixel set, computing a corresponding plurality of features of the second plurality of images, wherein each first image pixel feature corresponds to a features of the second plurality of images of the corresponding plurality of features of the second plurality of images, and wherein each second image pixel set may be computed as a combination of a subset of the plurality of features of the second plurality of images and each feature of the second plurality of images of the subset corresponds to a feature of the first plurality of images in the subset of the features of the first plurality of images for the first image pixel set that corresponds to the second image pixel set;
storing, in the feature set dictionary, a mapping between each feature of the first plurality of images and each corresponding feature of the second plurality of images;
receiving a first particular image of the first type;
generating a second particular image of the second type using the first particular image and the feature set dictionary.

2. The computer system of claim 1, wherein the first type is a first image resolution and the second type is a second image resolution which is a higher resolution than the first image resolution.

3. The computer system of claim 2, wherein the one instructions, when executed by the one or more processors, further cause the one or more processors to perform:
transforming the first particular image from the first image resolution to the second image resolution;
identifying a plurality of first particular image pixel sets of the transformed particular image;
for each of the plurality of first particular image pixel sets:
identifying a particular subset of the features of the first plurality of images in the feature set dictionary such that the first particular image pixel set may be computed as a linear combination of the particular subset of the features of the first plurality of images;
for each feature of the first plurality of images in the particular subset, identifying a corresponding feature of the second plurality of images in the feature set dictionary;
computing a second particular image pixel set as a linear combination of the identified corresponding features of the second plurality of images;
generating and displaying, on a computing device, the second particular image from the second particular image sets.

4. The computer system of claim 3, wherein the one instructions, when executed by the one or more processors, further cause the one or more processors to perform:
computing the plurality of first image pixel set features such that each first image pixel set may be computed as a linear combination of the subset of the plurality of first image pixel set features with first weights for each feature in the subset;
computing the corresponding plurality of second image pixel set features such that each second image pixel set may be computed as a linear combination of the subset of the corresponding plurality of second image pixel set features with the same first weights for each feature in the subset as the corresponding first weights for each feature in the corresponding subset;
for each of the first particular image sets:
identifying, with the particular subset of the plurality of first image pixel set features, second weights for each feature such that the first particular image pixel set may be computed as a linear combination of the particular subset of the plurality of first image pixel set features with the second weights for each feature in the particular subset;
computing the second particular image pixel set as a linear combination of the identified corresponding second image pixel set features with the same second weights for each feature in the subset as the corresponding second weights for each feature in the corresponding particular subset.

5. The computer system of claim 3, wherein the first plurality of images comprise a plurality of images of one or more fields, the second plurality of images comprise a corresponding plurality of images of the one or more fields, the first particular image comprises a image of a particular field at a particular time where a corresponding image of the second image resolution is unavailable.

6. The computer system of claim 5, wherein the one instructions, when executed by the one or more processors, further cause the one or more processors to perform:

receiving a third particular image of the particular field at the first image resolution corresponding to a previous time before the particular time;

transforming the third particular image from the first image resolution to the second image resolution;

identifying a plurality of third particular image pixel sets of the transformed particular image;

for each of the third particular image pixel sets:
identifying a third subset of the plurality of first image pixel set features such that the third particular image pixel set may be computed as a linear combination of the third subset of the plurality of first image pixel set features;

for each first image pixel set feature of the third subset, identifying a corresponding second image pixel set feature;

computing a fourth particular image pixel set as a linear combination of the identified corresponding second image pixel set features;

generating a fourth particular image of the particular field from the fourth particular image pixel sets;

receiving a fifth particular image of the particular field at the second image resolution corresponding to the previous time;

computing a plurality of differences between the fourth particular image and the fifth particular image;

based on the plurality of differences, adjusting the generated second particular image.

7. The computer system of claim 5, wherein the one instructions, when executed by the one or more processors, further cause the one or more processors to perform:

receiving a third particular image of the particular field at the second image resolution corresponding to a previous time before the particular time;

identifying a plurality of third particular image pixel sets of the third particular image;

for each of the third particular image pixel sets:
identifying a third subset of the corresponding plurality of second image pixel set features such that the third particular image pixel set may be computed as a linear combination of the third subset of the plurality of second image pixel set features;

for each second image pixel set feature of the third subset, identifying a corresponding first image pixel set feature;

computing a fourth particular image pixel set as a linear combination of the identified corresponding first image pixel set features;

generating a fourth particular image of the particular field from the second particular image sets;

transforming the fourth particular image of the particular field from the second image resolution to the first image resolution;

transforming the transformed fourth particular image from the first image resolution to the second image resolution;

identifying a plurality of fourth particular image pixel sets of the transformed particular image;

for each of the fourth particular image pixel sets:
identifying a fourth subset of the plurality of first image pixel set features such that the fourth particular image pixel set may be computed as a linear combination of the fourth subset of the plurality of first image pixel set features;

for each first image pixel set feature of the fourth subset, identifying a corresponding second image pixel set feature;

computing a fifth particular image pixel set as a linear combination of the identified corresponding second image pixel set features;

generating a fifth particular image of the particular field from the fifth particular image pixel sets;

computing a plurality of differences between the third particular image and the fifth particular image;

based on the plurality of differences, adjusting the generated second particular image.

8. The computing system of claim 2, wherein, for each image of the first plurality of images, transforming the image into a transformed image of the second image resolution comprises interpolating each pixel of the image to a high resolution grid using bicubic interpolation.

9. The computer system of claim 1, wherein the first plurality of images is generated from a first plurality of frequency bands, the second plurality of images is generated from a second plurality of frequency bands, the first particular image is generated from the first plurality of frequency bands, and the second plurality of frequency bands includes a particular frequency band that is not included in the first plurality of frequency bands, and wherein the one or more instructions, when executed by the one or more processors, further cause the one or more processors to perform:

computing the corresponding plurality of second image features such that one or more of the corresponding plurality of second image features may be used to compute an image pixel set comprising the particular frequency band;

computing each second particular image pixel set as a linear combination of the identified corresponding second image pixel set features such that the second particular image includes the particular frequency band.

10. A method comprising:
receiving a first plurality of images at a first image resolution and a second plurality of images at a second image resolution, wherein the first image resolution is lower than the second image resolution;

for each image of the first plurality of images:
transforming the image into a transformed image of the second image resolution;
identifying a plurality of first image pixel sets comprising a plurality of pixels of the transformed image;
identifying, for each first image pixel set, a corresponding second image pixel set of the second plurality of images;
storing each first image pixel set and each corresponding second image pixel set in a database repository of corresponding image pixel sets;

based on the first image pixel sets in the database repository of corresponding image pixel sets, computing a plurality of first image pixel set features, wherein each first image pixel set may be computed as a linear combination of a subset of the plurality of first image pixel set features;

based on the first image pixel set features for each first image pixel set and corresponding second image pixel set, computing a corresponding plurality of second image pixel set features, wherein each first image pixel feature corresponds to a second image pixel set feature of the corresponding plurality of second image pixel set features, and wherein each second image pixel set may be computed as a linear combination of a subset of the corresponding plurality of second image pixel set features and each second image pixel feature of the subset corresponds to a first image pixel feature in the subset of the plurality of first image pixel set features for the first image pixel set that corresponds to the second image pixel set;

storing, in a data record, each first image pixel feature and each corresponding second image pixel feature;

receiving a first particular image at the first image resolution;

transforming the first particular image from the first image resolution to the second image resolution;

identifying a plurality of first particular image pixel sets of the transformed particular image;

for each of the plurality of first particular image pixel sets:
identifying a particular subset of the plurality of first image pixel set features such that the first particular image pixel set may be computed as a linear combination of the particular subset of the plurality of first image pixel set features;
for each first image pixel set feature of the particular subset, identifying a corresponding second image pixel set feature;
computing a second particular image pixel set as a linear combination of the identified corresponding second image pixel set features;

generating and displaying, on a computing device, a second particular image from the second particular image sets.

11. The method of claim 10, further comprising:
computing the plurality of first image pixel set features such that each first image pixel set may be computed as a linear combination of the subset of the plurality of first image pixel set features with first weights for each feature in the subset;
computing the corresponding plurality of second image pixel set features such that each second image pixel set may be computed as a linear combination of the subset of the corresponding plurality of second image pixel set features with the same first weights for each feature in the subset as the corresponding first weights for each feature in the corresponding subset;
for each of the first particular image sets:
identifying, with the particular subset of the plurality of first image pixel set features, second weights for each feature such that the first particular image pixel set may be computed as a linear combination of the particular subset of the plurality of first image pixel set features with the second weights for each feature in the particular subset;
computing the second particular image pixel set as a linear combination of the identified corresponding second image pixel set features with the same second weights for each feature in the subset as the corresponding second weights for each feature in the corresponding particular subset.

12. The method of claim 10, wherein the first plurality of images is generated from a first plurality of frequency bands, the second plurality of images is generated from a second plurality of frequency bands, the first particular image is generated from the first plurality of frequency bands, and the second plurality of frequency bands includes a particular frequency band that is not included in the first plurality of frequency bands, and the method further comprising:
computing the corresponding plurality of second image features such that one or more of the corresponding plurality of second image features may be used to compute an image pixel set comprising the particular frequency band;
computing each second particular image pixel set as a linear combination of the identified corresponding first image pixel set features such that the second particular image includes the particular frequency band.

13. The method of claim 10, wherein the first plurality of images comprise a plurality of images of one or more fields, the second plurality of images comprise a corresponding plurality of images of the one or more fields, the first particular image comprises a image of a particular field at a particular time where a corresponding image of the second image resolution is unavailable.

14. The method of claim 13, further comprising:
receiving a third particular image of the particular field at the first image resolution corresponding to a previous time before the particular time;
transforming the third particular image from the first image resolution to the second image resolution;
identifying a plurality of third particular image pixel sets of the transformed particular image;
for each of the third particular image pixel sets:
identifying a third subset of the plurality of first image pixel set features such that the third particular image pixel set may be computed as a linear combination of the third subset of the plurality of first image pixel set features;
for each first image pixel set feature of the third subset, identifying a corresponding second image pixel set feature;
computing a fourth particular image pixel set as a linear combination of the identified corresponding second image pixel set features;
generating a fourth particular image of the particular field from the fourth particular image pixel sets;
receiving a fifth particular image of the particular field at the second image resolution corresponding to the previous time;
computing a plurality of differences between the fourth particular image and the fifth particular image;
based on the plurality of differences, adjusting the generated second particular image.

15. The method of claim 13, further comprising:
receiving a third particular image of the particular field at the second image resolution corresponding to a previous time before the particular time;
identifying a plurality of third particular image pixel sets of the third particular image;
for each of the third particular image pixel sets:
identifying a third subset of the corresponding plurality of second image pixel set features such that the third particular image pixel set may be computed as a linear combination of the third subset of the plurality of second image pixel set features;
for each second image pixel set feature of the third subset, identifying a corresponding first image pixel set feature;
computing a fourth particular image pixel set as a linear combination of the identified corresponding first image pixel set features;
generating a fourth particular image of the particular field from the second particular image sets;
transforming the fourth particular image of the particular field from the second image resolution to the first image resolution;

transforming the transformed fourth particular image from the first image resolution to the second image resolution;

identifying a plurality of fourth particular image pixel sets of the transformed particular image;

for each of the fourth particular image pixel sets:
  identifying a fourth subset of the plurality of first image pixel set features such that the fourth particular image pixel set may be computed as a linear combination of the fourth subset of the plurality of first image pixel set features;
  for each first image pixel set feature of the fourth subset, identifying a corresponding second image pixel set feature;
  computing a fifth particular image pixel set as a linear combination of the identified corresponding second image pixel set features;

generating a fifth particular image of the particular field from the fifth particular image pixel sets;

computing a plurality of differences between the third particular image and the fifth particular image;

based on the plurality of differences, adjusting the generated second particular image.

16. The method of claim 10, wherein, for each image of the first plurality of images, transforming the image into a transformed image of the second image resolution comprises interpolating each pixel of the image to a high resolution grid using bicubic interpolation.

* * * * *